May 21, 1963

T. B. HOLLAR ETAL 3,090,225

METHOD AND APPARATUS FOR SHEAR TESTING

Filed Oct. 16, 1959

INVENTORS
TRAVIS B. HOLLAR
WALLACE F. HARBISON
BY
Walter J. Jason
ATTORNEY

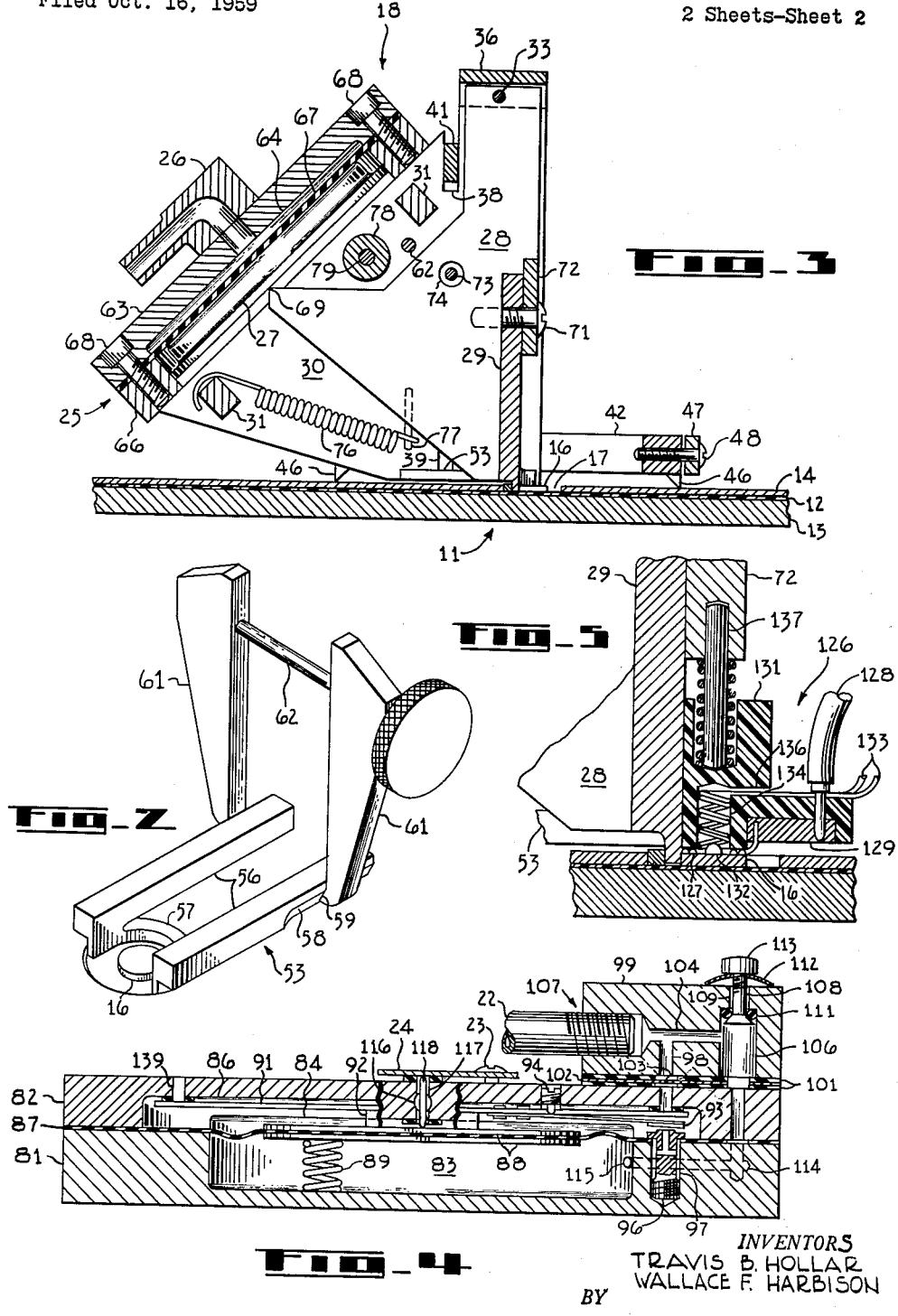

United States Patent Office 3,090,225
Patented May 21, 1963

3,090,225
METHOD AND APPARATUS FOR SHEAR TESTING
Travis B. Hollar and Wallace F. Harbison, Fort Worth, Tex., assignors to General Dynamics Corporation (Convair Division), San Diego, Calif., a corporation of Delaware
Filed Oct. 16, 1959, Ser. No. 846,993
10 Claims. (Cl. 73—101)

The present invention relates generally to structural testing; and more particularly, to a method and apparatus for testing the shear strength of laminated structures.

The shear strength of laminated structural components is often quite important in the satisfactory functioning of such components. This is especially true in the case of the "sandwich" panel type construction currently employed in several advanced design aircraft. Such a sandwich panel typically consists of a relatively thin sheet of metal bonded by means of a suitable adhesive material over a reinforcing framework or slug of heavy gage metal in which certain areas have been reduced in thickness to form shallow cavities wherein are placed sections of a low density, cellular core material such as fiberglass or metal foil. The bond between the metal sheet, which serves as the outer skin of the aircraft, and the framework must be strong enough to withstand the severe aerodynamic shear loads imposed thereupon in high speed flight and unusual flight conditions. Since the bond shear strength is of great importance to the structural integrity of the panel, it is necessary to determine the shear strength of such a panel prior to its assembly on the aircraft.

One prior method of shear testing such sandwich panels requires that an excess area or "test tab" of solid material be provided along an edge of the panel. After the bonding operation is completed the "test tab" is separated from the panel and sawed into several rectangular test specimens. At one end of a test specimen the outer skin is milled away, while at the opposite end the slug is similarly removed, thereby leaving only a central bond area of known dimension. The test specimen is then placed in a large hydraulic tension device and pulled apart parallel to its length. The force required to separate the specimen, divided by the bond area, is the shear strength of the bonded panel.

Another testing approach or method, which is often employed in conjunction with the above method, involves the periodic testing of an actual panel, rather than merely a test tab. In this approach, one panel out of a given number of panels is sawed into test specimens and tested essentially as described above.

Several disadvantages, however, are inherent in both of the above methods. In the test tab method the most serious objection is that the shear tests performed on the test tab yield no information concerning the shear strength of the panel proper. Another disadvantage is that a true shear strength is not obtained because of the offset eccentricity of the outer skin and the frame. Other disadvantages are the time and expense involved in preparing the test tab and specimens for testing.

In the second method the obvious disadvantages are that the shear tests are not performed on each individual panel but on a single panel which is assumed to be representative of a group, and the great expense involved in destroying such a panel.

In contrast with these prior testing methods or apparatus, the present invention is characterized as a method, and associated apparatus, for determining the shear strength of laminated structures wherein a small, circular test "button" on such a structure is sheared off by means of a small, portable load imparting mechanism rigidly attached to the structure. Of primary importance is the fact that the present invention makes it possible to obtain a true shear value at any position on a laminated structure. It thus tests the actual panel, and every panel if desired. The test in no way permanently damages the tested structure, as the test "button" is easily replaced. The apparatus is also small enough to be used as a field instrument and may therefore be used to test structural panels installed on operational aircraft. This is especially advantageous in situations in which a panel or panels have been damaged and a determination must be made as to whether or not replacement is necessary. And, since no permanent damage occurs with the present method, the previously experienced high testing cost is virtually eliminated. Still further, the invention may be adapted for determining the shear strength of the structure at elevated temperatures, which is an important consideration in aircraft structures.

It is, therefore, an object of the invention to provide an apparatus for determining the true shear strength of laminated structures at any desired location on such structures.

Another object of the invention is to provide a non-destructive method and apparatus for determining the shear strength of laminated structures.

Another object of the invention is to provide an apparatus for determining the shear strength of laminated structures which is small enough to be used as a field instrument.

A further object of the invention is to provide a method for determining the shear strength of laminated structures which is simple, rapid and inexpensive to practice.

These and other objects and features of the present invention will be readily apparent to those skilled in the art from the following specification and appended drawings wherein is illustrated a preferred form of the invention, and in which:

FIGURE 2 shows the device by which the load imparting mechanism is attached to the sandwich panel;

FIGURE 3 is a cross-sectional view through the load imparting mechanism taken along line III—III of FIGURE 1;

FIGURE 4 is a cross-sectional view showing the load regulating device employed in the present invention taken along line IV—IV of FIGURE 1; and FIGURE 5 shows, in cross-section, a heating apparatus used in a "hot-test" of the panel shear strength.

Figure 1:
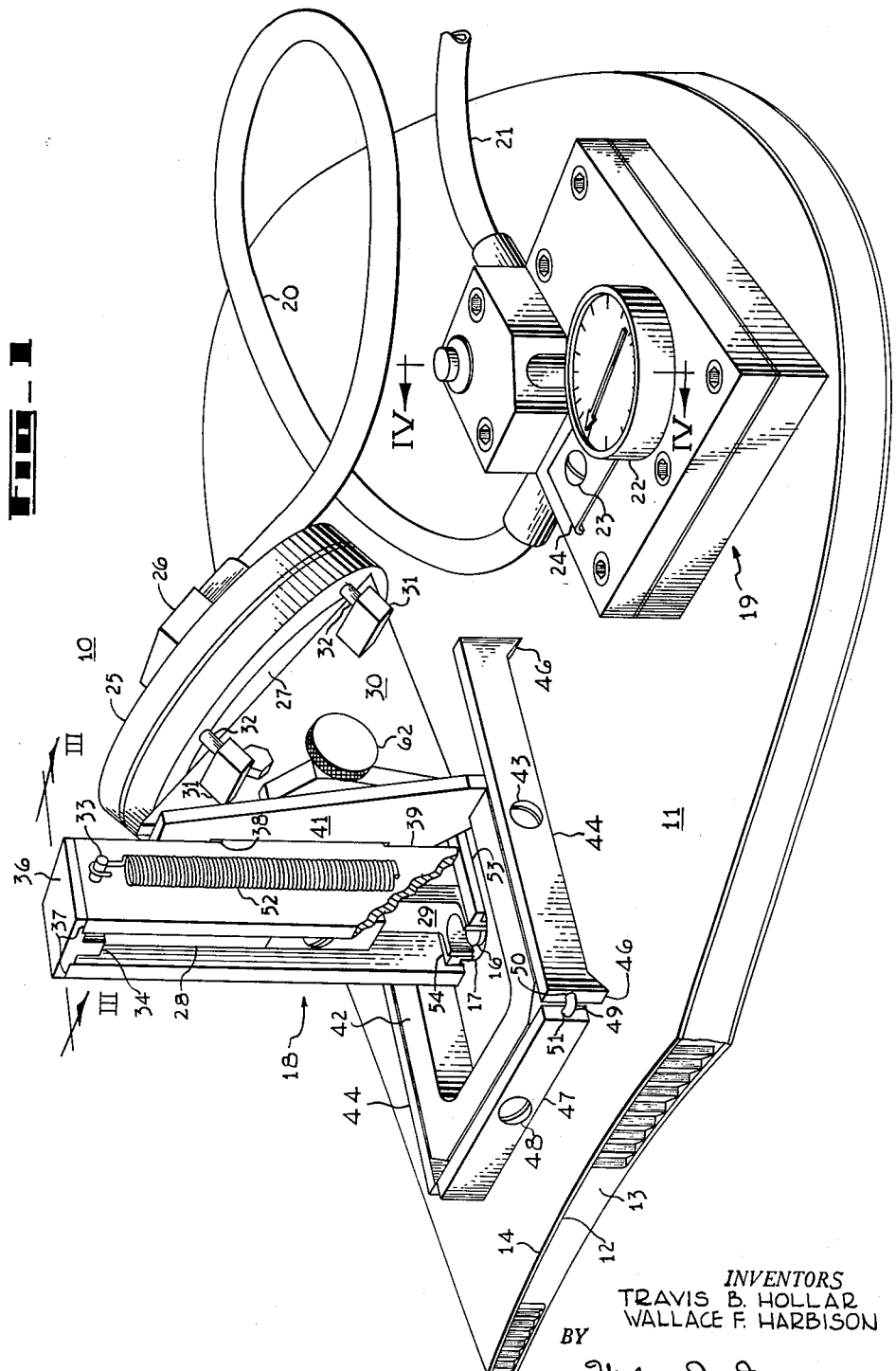
FIGURE 1 is a perspective view of a physical embodiment of the invention as it may be employed to test the shear strength of a typical sandwich panel construction.

Referring now to the drawings, and in particular to FIGURE 1, the apparatus of the invention, generally indicated by the numeral 10, is shown mounted in operating position upon a section of a typical curved, sandwich panel construction 11. In the example shown it is desired to determine the shear strength of the bond surface, indicated at 12, between the internal reinforcing slug 13 and the external skin 14. In order to make such a determination it is first necessary to prepare a small, circular test plug or button 16 in skin 14. This is done by removing the material from around the test button, thus leaving an annular space 17 thereabout. Such a removal of material may be satisfactorily effected by means of a cylindrical cutter having saw teeth the width of the space 17 about the bottom, outer perimeter thereof. It is important that the depth of the space or recess 17 be equal to the thickness of the skin 14, since an improper depth will result in erroneous test results.

The apparatus of the invention includes two basic components, a load imparting mechanism or shear head 18 which serves to exert a shear load on the button 16 parallel to the bond surface 12, and a pressure regulating device 19 for controlling the rate at which the shear load is applied. The shear head is connected to the regulator through a pressure conduit 20. The regulator, in turn, is connected to a source of air pressure (not shown) by another pressure conduit 21. A pressure gauge 22 is provided in conjunction with the regulator to give an indication of the pressure in the pneumatic system. It is desirable to calibrate the pressure gauge directly in pounds per square inch of shear load so that the desired value may be read directly. On the top surface of the regulator 19 is affixed, by means of a screw 23, a flanged strip 24 of resilient metal which, as will be seen, functions as a pressure relief valve.

The shear head comprises a pressure receiving vessel or cylinder 25 to which the conduit 20 is connected through an adaptor 26. Within cylinder 25 is disposed a piston 27 which, as can be seen, is contiguous upon the after edge of a load arm 28. An adaptor 29 is attached along the forward edge of arm 28 and its lower portion is formed into a concavity so as to conform to the test button 16. This lower portion of adaptor 29 serves to transmit forces on the piston 27 to the test button. The cylinder 25 is supported by a pair of identical, parallel frame components 30; the cylinder being attached to the sloping rear edges thereof by means of a pair of cross bars 31 extending through the frames 30, and studs 32 which extend through the cylinder and engage the cross bars. The load arm 28 is supported by being pivoted between the frames 30 about a pin 33 which extends through the forward, upper portion of the frames 30, the load arm 28, and a downward protrusion 34 of a crosspiece 36 placed across the top surfaces of the frames. Along the outer edge of the lower surface of the crosspiece 36 are a pair of steps 37 which accommodate the upper edges of the frames 30 and which serve to maintain the proper spacing between the frames.

In the central portion of each of the frames 30 are a pair of aligned, vertical slots 38 and 39 which are parallel to the load adaptor 29, the slot 38 being open at the upper surface of the frame and the slot 39 being open at the lower surface of the frame. Within these slots is disposed a slidable plate 41 centrally slotted to fit over the frames as shown. At its lower end the plate 41 is rigidly attached by means of screws (not shown) to a horizontally disposed, U-shaped base 42. The plate 41 is attached to the base 42 in such a manner that they are perpendicular to each other. Two longitudinal leg members 44 are rotatably attached at their mid points, by means of screws 43, along each side of base 42, with each end of the leg members being formed into a knife edged foot 46. A leg member 47 is positioned along the forward portion of the base 42 and is rotatably attached at its midpoint to base 42 by a screw 48. At their forward ends the leg members 44 are rotatably joined to the transverse leg member 47 by a pair of linkage wires 49 bent to form right angles, the ends of which are inserted into apertures 50 in leg members 44 and apertures 51 in transverse member 47. Springs 52 connected to the pin 33 and the base 42 on either side of the frames 30 serve to exert a downward force on the frames, as will be seen.

The combination of plate 41, base 42, leg members 44, 47 and linkage 49 constitutes a normalizer device for establishing perpendicularity on a curved structure between the load arm adaptor 29 and the bond surface 12 at the position of the test button 16. The leg members 44 and 47 are so attached that an upward movement of the rear foot 46 of one of the longitudinal legs results in an equivalent upward movement of the forward foot of the other leg 44, and vice versa. The load arm adaptor 29 is assembled so that it is perpendicular to a line drawn between the forward foot of one leg 44 and the rear foot of the other leg 44, regardless of the respective positions of the feet 46 on the surface of the panel 11. The load arm adaptor 29 is further assembled so that it is perpendicular to the lines connecting the forward and rear feet 46 of opposite leg members 44 at the point of intersection of such lines, which point is the center of test button 16.

The shear head 18 is rigidly attached to the panel 11 by means of a securing device 53 which is disposed within longitudinal grooves 54 in the lower forward surface of the frame members 30. The securing device 53 may be more clearly understood by reference to FIGURE 2 of the drawings. As shown in this figure, securing device 53 includes a pair of parallel lever arms 56 between which and integral therewith is a semi-circular center portion 57 which is disposed within the space 17 about the test button 16. The outside radius of the center portion 57 is substantially equal to the outer radius of the space 17. The inner radius of the center portion is of such dimension as to provide for the positioning of the lower concave portion of the load arm adaptor 29 between the test button 16 and the securing device 53. The outer, lower edges of the lever arms 56 are chamfered at their rear portions, as indicated at 58. The chamfered surfaces 58 are in contact with the lower, inwardly extending surfaces 59 of side members 61 which are positioned adjacent frame components 30, shown by the dotted lines. A knurled thumbscrew 62 extends through the side members 61 and frames 30, the rotation of which urges the side members together and, consequently, exerts an inward force at the rear end of the lever arms 56 that results in an outward force at the forward end of the lever arms. Such outward force acts against the outer diameter of the space 17 surrounding the test button 16, thereby firmly securing the shear head in the desired position.

Referring again to FIGURE 1, the shear head is attached to the panel by first positioning the center portion of securing device 53 in the space 17 above test button 16. The normalizing device, which is usually held above the level of the securing device by the tension in springs 52, is then forced downward and rotated about until all four of the feet 46 contact the panel surface. When all four of the feet 46 contact the panel surface then shear head 18 is normal to the panel surface. The thumbscrew is then tightened and the shear head is thereby rigidly secured in position. Once this is achieved, the normalizing device can be released and springs 52 will withdraw it to its usual position.

After the shear head 18 has been secured to the panel 11 in the manner described above, the air pressure from the pressure source is admitted to the cylinder 25. The cylinder 25, as seen in FIGURE 3, comprises a circular plate 63 having a shallow cavity 64 therein, a ring component 66, and resilient diaphragm 67 disposed between the two former components to prevent leakage. The plate 63, diaphragm 67 and ring 66 are joined together by a plurality of studs 68 about the periphery of the cylinder. The pressure in the cylinder acts upon the piston 27 through the diaphragm, and piston 27 in turn transmits a force to the load arm 28. The aft edge of the load arm, which is contiguous with the piston, is preferably formed into a knife edge 69 to prevent loading eccentricities. The load arm adaptor 29, which is securely attached to the load arm 28 by a stud 71 and a plate 72, applies a shear load upon the test button 16 parallel to the bond surface 12. The bottom surface of the adaptor 29 is adjusted so that it is approximately five thousandths of an inch above the bond surface 12, so as to prevent the adaptor from dragging on the adhesive. When the shear strength of the structure is exceeded, the test button is sheared loose and the load arm moves forward. In order to prevent damage to the surrounding skin, a stop is provided which consists of a pin 73 extending between the frames 30 and through an aperture 74 in the load arm. The pin 73 and aperture 74 are so located and sized in relation to each other that the motion of the load arm is terminated prior to the position at which the sheared test button 16 contacts the surrounding skin.

A spring 76, attached at its aft end to the lower cross bar 31 and at its forward end to a dowel 77 pressed into the lower, sloping surface of load arm 28, serves to retract the load arm to its original position when the pressure in cylinder 25 is sufficiently reduced.

Since considerable forces are applied to various parts of the apparatus, it may be desirable to provide other spacing elements in addition to crossbars 31, such as the apertured cylinder shown at 78, positioned between the frames 30 by means of a bolt 79 extending therethrough.

In the determination of the shear strength of most laminated structures it is important that the shear load be applied at a relatively slow, constant rate, increments since high impulse loading results in an unusually high shear strength reading. In shear strength determinations on sandwich panel structures which serve as the external skin of an aircraft, it is desirable to simulate the actual aerodynamic shear load rate conditions which the structures will undergo in operation. Such load rate control is accomplished by means of the pressure regulator 19 shown in FIGURES 1 and 4.

Referring now to FIGURE 4, the pressure regulator 19 shown therein includes a pair of superposed plates 81 and 82. The lower plate 81 is formed with a circular pressure chamber 83 therein. In the upper plate 82 is another circular pressure chamber 84 which aligns with chamber 83, and a diagonal groove 86 which is somewhat deeper than the chamber 84 and extends beyond the diameter thereof. The pressure chambers 83 and 84 are divided by a resilient, impermeable diaphragm 87 disposed therebetween. Attached to opposite sides of the diaphragm 87 are a pair of circular metal plates 88 whose diameter is somewhat smaller than the diameter of the pressure chambers. A spring 89 is positioned in the lower pressure chamber 83 at a distance from the center thereof along the groove 86, which spring exerts an upward force on the diaphragm 87. To the upper plate 88 is affixed a strip 91 which is disposed within the groove 86. The strip 91 is spaced from the upper plate 88 by a small spacer 92 at the center thereof. Another metal strip 93 is spot welded at one end to the strip 91. A small set screw 94 extends through upper plate 82 and strip 91 and abuts against the strip 93, thereby establishing the distance between the strip 93 and an apertured stud 96 which is threadedly inserted into aperture 97 in lower plate 81.

The air from the pressure source enters the pressure regulator through a passage (not shown) open to the aperture 97. In the aperture 97 the air passes between the stud and the aperture walls, through the aperture in stud 96 and into the upper pressure chamber 84. When the pressure on the diaphragm becomes great enough to overcome the upward force of the spring, the side of the diaphragm adjacent the strip 93 moves downward. This results in a simultaneous downward motion of the strips 91 and 93, with strip 93 closing the aperture in stud 96 and shutting off the air pressure. The downward movement of strip 91 opens a passage 98 which extends upward through the upper plate 82 at one end of the groove 86 and into top plate 99 affixed at a corner of the upper plate 82. Between the top plate 99 and the upper plate 82 are disposed a pair of apertured gaskets 101. A thin piece of sheet metal 102 having a small orifice 103 therethrough is disposed between gaskets 101 in such a manner that its orifice 103 aligns with passage 98. At its upper end, passage 98 communicates with a horizontal passage 104 which, in turn, opens into another passage 106 extending downward through upper plate 82. The pressure gage 22 is connected to the passage 104 at opening 107. At the top of passage 106 is located a pressure release mechanism including a stud 108 extending upward through an opening 109. A rubber O-ring 111 is disposed about, and above the head of, stud 108, which is urged upwardly by a disc spring 112. Above the disc spring a nut 113 is attached to the stud to secure the stud 108 in position.

At the upper surface of the lower plate 81 the passage 106 communicates with a passage 114, shown by the dotted lines, the horizontal portion of which is drilled at an angle to circumvent aperture 97. The passage 114 opens into the lower pressure chamber 83 at 115.

The air pressure in the upper pressure chamber 84 thus bleeds into the lower pressure chamber 83 to exert an upward force on diaphragm 87. This upward force, in conjunction with the spring force, overcomes the pressure in the upper chamber 84 and causes the diaphragm to move upward and reopen the inlet aperture in stud 97. Consequently, the pressure in the upper chamber 84 increases, and thereafter the pressure in the lower chamber 83 increases again. Eventually a dynamic pressure equilibrium is effected between the two chambers so that the combined air and spring pressures in the lower chamber 83 is equal to the air pressure in the upper chamber 84; and, although the air pressures in both chambers are continually increasing, there exists a substantially constant pressure differential therebetween. The rate at which the pressures in the chambers change is determined by the size of the orifice 103 in passage 98, since this orifice controls the air flow rate from the upper chamber 84 to the lower chamber 83.

The pressure in the upper chamber 84 is transmitted to the shear head through a passage 116 which joins the pressure conduit 20 (FIGURE 1). The passage 116 opens into an aperture 117 adjacent the groove 86. Such aperture 117 extends from the top surface of the upper pressure chamber 84 through the top surface of the upper plate. Within the aperture 117 is positioned a pin 118 which serves to raise the strip 24 when the diaphragm 87 moves upward through a certain level as a result of a rapid decrease in pressure in the upper chamber 84. Such pressure decrease occurs when the test button is sheared. When the test button shears off, the air compressed in the upper chamber 84 flows to the shear head, resulting in a rapid upward motion of diaphragm 87. The diaphragm 87, acting upon the pin 118, forces the strip upward, thereby opening the aperture 117 and exhausting the remaining compressed air to the atmosphere. When the diaphragm moves up in this manner it also causes the strip 91 to close the passage 98. The pressure required to shear the test button is, in this manner, recorded on the pressure gage. Such pressure is released by depressing the nut 113, thereby venting the opening 109 to the atmosphere.

In order to prevent a high impulse load on the test button, an exhaust port 139 is provided at the groove end opposite passage 98. Under normal pressures the exhaust port 139 is maintained closed by the force of the spring 89 acting on the strip 91. However, in the event of an excessively high pressure, the end of strip 91 covering the exhaust port 139 moves down with the diaphragm 87, thereby opening the port and allowing the compressed air to escape therethrough.

In order to assure proper sealing, rubber washers are affixed to the upper plate 82 at the lower openings of passage 98, exhaust port 139 and passage 116, as well as at the upper opening of passage 116 and to the end of strip 93.

One of the factors which affects the shear strength of a bonded structure is the temperature of the structure. In high speed flight, where skin temperatures may reach several hundred degrees Fahrenheit, the shear strength may be materially reduced. It is often quite important, therefore, that a determination of shear strength be made under the temperature conditions of high speed flight. A device for performing a shear "hot-test" is shown in FIGURE 5.

The heating device 126 consists of a flat coil 127 of a high resistance conductor, such as Nichrome wire, placed upon the test button 16. Coil 127 is connected to a high voltage transformer (not shown) through a pair of plug-in type conductors 128 and a pair of adaptor elements 129 disposed within a block 131 of insulating material, such as Micarta. A thermocouple 132 is also placed upon the test button 16 in the center of the coil 127 and serves to control the temperature of the button as desired. The thermocouple leads 133 are coiled to form a spring thus assuring adequate contact with the button, and are disposed within aperture 134 in the lower surface of block 131. The thermocouple leads exit from the block 131 through another aperture 136. The block 131 is positioned adjacent the load arm extension by means of a dowel 137 pressed into attachment plate 72 and extending into an aperture in the top of block 131. A spring about dowel 137 exerts a downward force on the block to facilitate the heating of the test button.

As thus described, the present invention comprises a very economical shear testing method and apparatus. It should be noted that there may be instances however, when the precise apparatus disclosed herein may require slight modification in order to perform properly. Such might be the case when it is desired to shear off a test button formed at the edge of a laminated body and the surrounding section of lamina removed to form the test button is less than a 360° section. Ordinarily though, such modification would be obvious and simple, taking advantage of the edge of the laminated structure for clamping action, structural support or the like.

And, although only the preferred embodiment of the invention has been specifically illustrated and described herein it is to be understood that the invention is not limited thereto, as many variations and modifications will be apparent to those skilled in the art, and the invention is to be given its broadest possible interpretation within the terms of the following claims.

What we claim is:

1. Apparatus for testing the shear strength of a laminated body having a surface with a recess therein which recess surrounds a test section of lamina and has a depth corresponding to the thickness of the test section of said lamina comprising, a supporting structure for being positioned adjacent said recess in said surface of said laminated body, means extending into said recess for securing said supporting structure on said surface of said laminated body, shearing means movably supported by said supporting structure for extending into said recess and for effecting a shear stroke to shear said test section of lamina in said recess from said laminated body, said shear stroke being substantially parallel to said surface of said laminated body when said supporting structure is secured to said body, and actuating means for actuating said shearing means.

2. Apparatus for testing the shear strength of a laminated body having a surface with a recess therein which recess surrounds a test section of lamina and has a depth corresponding to the thickness of the test section lamina comprising, a supporting structure for being positioned adjacent said recess, releasable means attached to said supporting structure for expanding into said recess and securing said supporting structure to said surface of said laminated body, shearing means movably supported by said supporting structure for extending into said recess and for producing a shear stroke that is substantially parallel to said surface of said laminated body when said supporting structure is secured to said body, and actuating means secured to said supporting structure for actuating said shearing means to shear said test section of lamina in said recess from said laminated body.

3. Apparatus for testing the shear strength of a laminated body having a surface with a recess therein which recess surrounds a test section of lamina and has a depth corresponding to the thickness of the test section of lamina comprising, a supporting structure for being positioned adjacent said recess in said surface of said laminated body, normalizing means for establishing perpendicularity between said supporting structure and said surface, securing means extending into said recess for securing said supporting structure on the surface of said laminated body without disturbing perpendicularity therebetween, shearing means pivotally supported by said supporting structure for extending into said recess and for producing a short in length shear stroke that shears said test section of lamina in said recess from said laminated body, said shear stroke being substantially parallel to said surface of said laminated body when said supporting structure is perpendicularly secured to said body by said securing means, and actuating means for actuating said shearing means.

4. Apparatus for testing the shear strength of a laminated body having a surface with a recessed area which recess surrounds a test section of lamina and has a depth corresponding to the thickness of the test section of lamina comprising, a supporting structure for being positioned adjacent said recess in said surface of said laminated body, securing means for extending into said recess and securing said supporting structure to said surface of said laminated body, shearing means movably supported by said supporting structure for extending into said recess and for shearing said test section of lamina in said recess from said laminated body, and actuating means for actuating said shearing means.

5. Apparatus for testing the shear strength of a laminated panel having a surface with a recess therein which recess surrounds a test section of lamina and has a depth corresponding to the thickness of the test section lamina comprising, a supporting structure for being positioned adjacent said recess in said surface of said laminated panel, securing means for extending into said recess and securing said supporting structure on said surface of said laminated panel, shearing means pivotally supported by said supporting structure for extending into said recess and for effecting a short in length shear stroke that shears said test section of lamina in said recess from said panel, said shear stroke being substantially parallel to said surface of said panel when said supporting structure is secured to said panel, actuating means for actuating said shearing means, and said actuating means including means for regulating the actuating of said shearing means.

6. Apparatus for testing the shear strength of a laminated body having a surface with a recess therein which recess surrounds a test section of lamina and has a depth corresponding to the thickness of the test section lamina comprising, a supporting structure for being positioned adjacent said recess in said surface of said laminated body, securing means connected to said supporting structure for extending into said recess and securing said supporting structure to said surface of said laminated body, shearing means pivotally mounted on said supporting structure for extending into said recess and for producing a short in length shear stroke that shears said test section of lamina in said recess from said laminated body, normalizing means connected to said supporting structure for establishing perpendicularity between said shearing means and said surface of said laminated body, said shear stroke being substantially parallel to said surface of said laminated body when the perpendicularity of said shearing means has been established, actuating means for actuating said shearing means, and control means for regulating and for indicating the force applied to said shearing means.

7. Apparatus for testing the shear strength of a laminated body having a surface with a recess therein which recess surrounds a test section of lamina and has a depth corresponding to the thickness of the test section lamina comprising, a supporting structure for being positioned adjacent said recess in said surface of said laminated body, securing means for extending into said recess and securing said supporting structure to said surface of said laminated body, shearing means movably supported by said supporting structure for extending into said recess and for effecting a shear stroke that shears said test section of lamina in said recess from said laminated body, said shear stroke being substantially parallel to said surface of said laminated body when said supporting structure is secured to said body, actuating means for actuating said shearing means, and means disposed adjacent said shearing means for heating said test section that said shearing means shears and for indicating the temperature of said test section.

8. Apparatus for testing the shear strength of a laminated body having a surface with a recess therein which recess surrounds a test section of lamina and has a depth corresponding to the thickness of the test section lamina, said apparatus comprising a supporting structure, a shearing arm pivotally mounted on said supporting structure, normalizing means connected to said supporting structure for establishing perpendicularity between said shearing arm and said surface of said body, holding means connected to said supporting structure for insertion into said recess and expanding therein to secure said supporting structure to said surface of said body and maintain the perpendicularity established by said normalizing means, said shearing arm having a shearing end for extending into said recess in which said holding means is disposed, fluid pressure operated actuating means associated with said supporting structure and said shearing arm for actuating said shearing arm, and control means for regulating and for indicating the force applied to said shearing arm 9. Apparatus for testing the shear strength of a laminated body having a surface with a recess therein which recess surrounds a test section of lamina and has a depth corresponding to the thickness of the test section lamina, said apparatus comprising a supporting structure, holding means connected to said supporting structure for insertion into said recess in said surface of said body and for expansion therein to secure said supporting structure to said surface, a shearing arm pivotally mounted on said supporting structure, a piston cylinder fixed to said supporting structure, a fluid pressure actuated piston in said cylinder, said piston disposed adjacent said shearing arm for actuating said shearing arm, a fluid flow passage connecting with said piston cylinder and having means for regulating and for indicating fluid pressure interposed therein, said shearing arm having a shearing end for being extended into said recess in which said holding means is disposed, said shearing end being movable in a shearing stroke in response to piston actuation for testing the shear strength of said test section of lamina disposed adjacent said shearing end, and stop means on said supporting structure interrupting and limiting said shearing stroke.

10. Apparatus for testing the shear strength of a laminated body having a surface with a recess therein which recess surrounds a test section of lamina and has a depth corresponding to the thickness of the test section of lamina, said apparatus comprising a supporting structure, securing means connected to said supporting structure for extending into said recess and securing said supporting structure to said surface of said laminated body, shearing means pivotally mounted on said supporting structure for producing a short in length shear stroke having a line of travel such that said test section of lamina can be sheared from said body, pressure operated actuating means for applying force to said shearing means, pressure control means for causing the force applied to said shearing means to be applied at a substantial constant rate of increase, said pressure control means having means for preventing the application of high impulse forces to said shearing means, and said shearing means extending into said recess in said surface of said body to which said supporting structure is secured and, in response to forces applied thereto by said actuating means and controlled by said control means, movable therein to shear said test section of lamina therein from said laminated body.

References Cited in the file of this patent
UNITED STATES PATENTS

| | | |
|---|---|---|
| 2,667,781 | Barrett | Feb. 2, 1954 |
| 2,855,496 | Lawless et al. | Oct. 7, 1958 |
| 2,924,969 | Clough et al. | Feb. 16, 1960 |
| 2,959,051 | Simek et al. | Nov. 8, 1960 |